April 22, 1924.  
J. RAU  
GLASS FEED MECHANISM  
Filed May 8, 1922  
1,491,067  
2 Sheets-Sheet 1

INVENTOR.  
JOHN RAU.  
BY  
Lockwood & Lockwood  
ATTORNEYS.

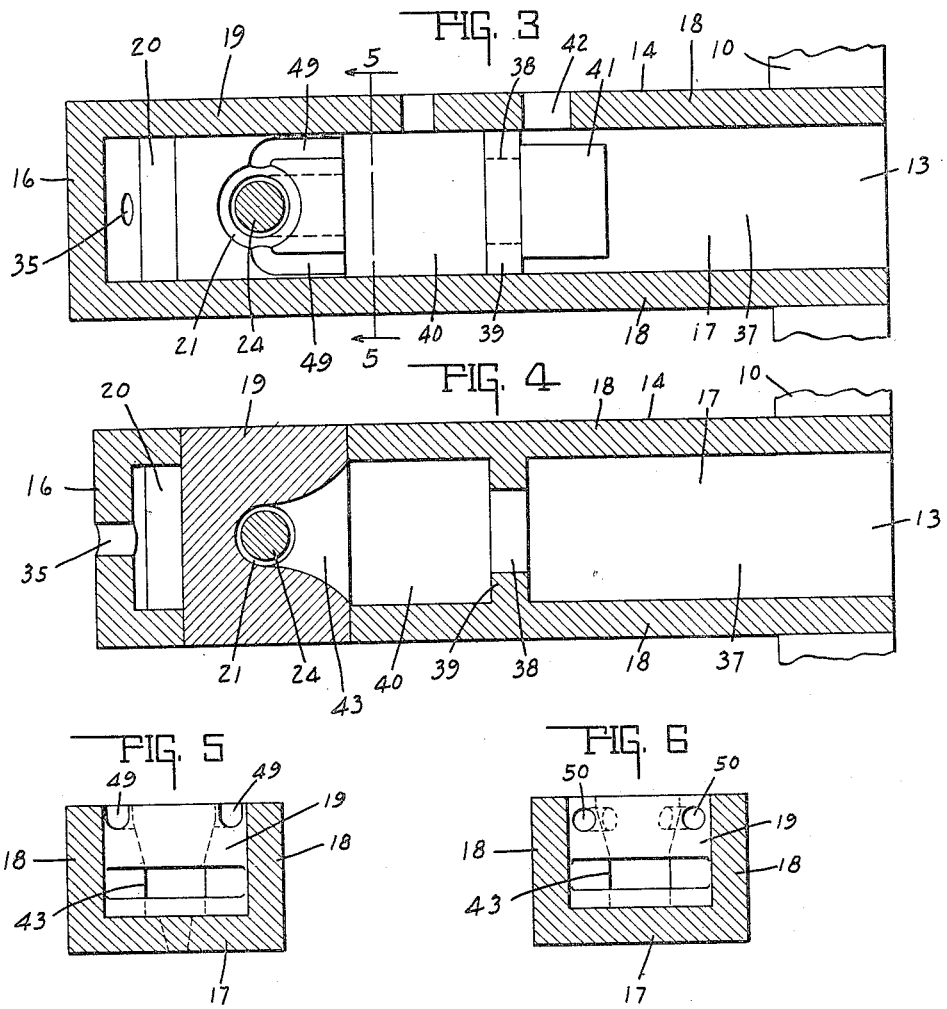

Patented Apr. 22, 1924.

1,491,067

UNITED STATES PATENT OFFICE.

JOHN RAU, OF INDIANAPOLIS, INDIANA.

GLASS-FEED MECHANISM.

Application filed May 8, 1922. Serial No. 559,239.

*To all whom it may concern:*

Be it known that I, JOHN RAU, a citizen of the United States, and a resident of Indianapolis, county of Marion, and State of Indiana, have invented a certain new and useful Glass-Feed Mechanism; and I do hereby declare that the following is a full, clear, and exact description thereof, reference being had to the accompanying drawings, in which like numerals refer to like parts.

This invention relates to an automatic glass feeder for discharging molten glass into a mould.

The main object of this invention is to effect an improved discharge spout and feeding mechanism for automatically feeding distinct gathers of glass from the tank direct to the mold whereby the molten glass discharged into the mold will be maintained at a substantially even temperature and prevented from becoming chilled on one side and causing the discharged gob or globule-like mass to be bent or formed out of proper shape and a deformity produced in the glass ware.

Another feature of the invention relates to the construction of the discharge pocket and communicating passageways for preventing air pockets being formed in the discharged glass.

Still another feature of the invention is the arrangement of the cut-off valve for the passage between the glass chambers for preventing the flow of glass therethrough when it is desired to empty the discharge chamber.

The full nature of this invention will be understood from the accompanying drawings and following description and claims.

Figure 1:
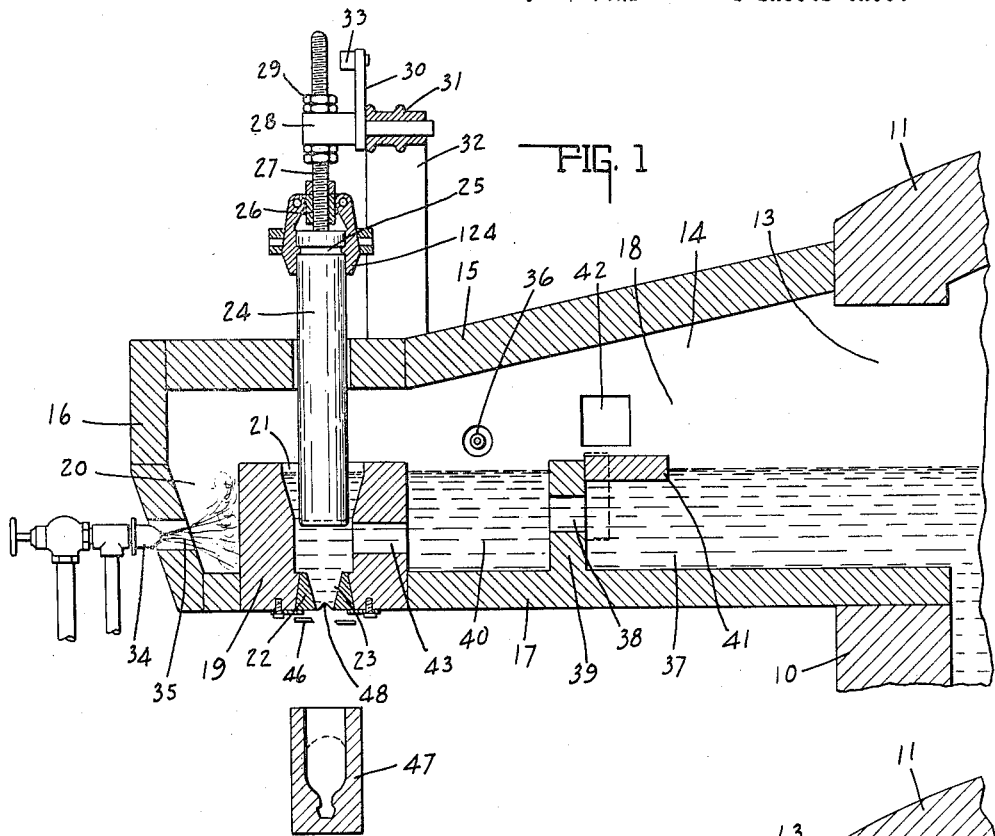
Figure 2:
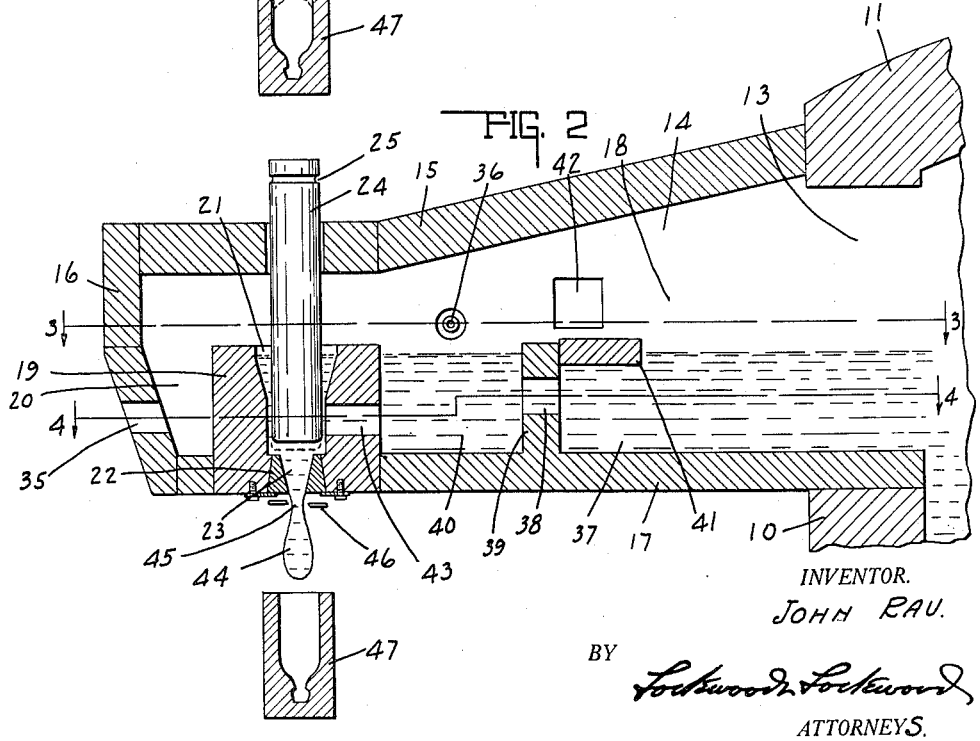

In the drawings Fig. 1 is a central vertical section taken through the discharge spout, showing the discharge plunger in elevated position ready to discharge a gob of glass. Fig. 2 is the same as Fig. 1 showing the discharge plunger after having discharged the gob and returning to the position shown in Fig. 1. Fig. 3 is a section taken on the line 3—3 of Fig. 2. Fig. 4 is a section taken on the line 4—4 of Fig. 2. Fig. 5 is a section taken on the line 5—5 of Fig. 3. Fig. 6 is the same as Fig. 5 showing a modified form of passage through the plunger block.

In the drawings there is shown a portion of a glass furnace having a wall 10 and a top 11 with an opening 13 for the passage of glass therefrom into the glass feeding or discharge spout 14. Said spout comprises a top wall 15, an end wall 16, a bottom 17 and side walls 18 built of fire clay stone in the usual manner. In the end of the spout there is a plunger block 19 which extends full width of the spout and from the bottom to a point above the glass level and is spaced from the end wall 16 so as to leave an empty heating space 20. Said block is provided with a central vertical cylindrical plunger chamber 21 which flares at the top and is reduced at the bottom by the insertion of the removable tubular bushing 22 which seats into an outwardly flared opening in the bottom of said block so that it may be readily removed. For removably securing said bushing in place, there is provided a ring 49 secured to the bottom of the block 19 so as to overlap and surround said bushing and support it in place. The bushing 22 is provided with a central discharge orifice 23 which tapers from a large opening at the top to a small opening at the bottom, as shown in Figs. 1 and 2. There is a glass discharge plunger 24 fitting and operating in the cylindrical part of the chamber 21. Said plunger extends upwardly through the top 15 so as to be reciprocable therethrough and in the chamber 21.

For reciprocating the plunger 24 and thereby alternately cutting off and discharging the glass through the orifice 23 there is provided a pair of gripping fingers 124 adapted to engage in the annular groove 25 surrounding the upper end of said plunger, which are pivotally mounted upon a sleeve 26 supported by the threaded pin 27 extending through the arm 28 and secured in position thereon by the nuts 29. The arm 28 is secured to the lever 30 which is pivotally mounted and supported in the bearing 31 mounted in any suitable manner as by the standard 32 shown herein. The plunger is operated by actuating the lever 30 by suitable timing mechanism, not shown herein, secured to the lug 33.

For maintaining the molten glass in the plunger chamber at substantially a high degree of temperature with which it enters therein, there is provided a burner 34 positioned so as to inject a flame into the heating space 20 through the opening 35 in the end wall. The flame striking against the block 19 will highly heat said block which will transmit the heat to the molten glass adjacent that side. The heat produced thereby will pass up through said space 20 so as indirectly to maintain a high temperature of the plunger 24 and the molten glass in the chamber 21. There is also provided a similar burner 36 in the side wall 18 of the discharge spout 14 for maintaining the glass in the spout at a high degree of temperature.

The molten glass flows freely from the furnace 13 into the receiving chamber 37 of the discharge spout, thence through a passage 38 formed in the partition wall 39 separating the chamber 37 from the feed chamber 40. The passage 38 is controlled by a float valve 41 adapted to float upon the molten glass and be maintained against the surface of the partition 39 by the current of glass flowing therethrough. Adjacent said valve there is an opening 42 in the side wall through which the operator may engage said valve and force it down into vertical position, as shown in dotted lines, for closing the passage 38. The buoyancy of said valve and the pressure of the glass thereon will at all times maintain it in proper position subject to its positioning by the operator for opening or closing said passage.

The molten glass passes from the feed chamber 40 through the inlet passage 43 in the plunger block 19 to the plunger chamber 21. A portion of this chamber below the inlet passage 43 and above the bushing 22 constitutes substantially the measuring chamber for predetermining the amount of glass in a gather, as the glass above the lower part of the passage 43 will not be discharged by the plunger, but will remain about the plunger and keep it heated at all times. The plunger, upon being forced downwardly, will force the glass below the passageway 43 down through the orifice 23 in the bushing 22 through which it will pass and hang in a gather or globule-like mass 44. The pressure exerted on the glass by the piston operating in the cylinder-like passage 21 will swell the gather of glass to produce the shape shown in Fig. 2. Upon the plunger being elevated, after having reached its lowermost position and forced predetermined gather of glass through said orifice, it will withdraw the undischarged glass upward and produce a reduced neck 45 with the gather of glass 44 suspended therefrom. The restriction of the neck permits the ready shearing of the glass by the shears 46, whereby the gather 44 is permitted to drop into the mold 47 positioned thereunder. As the plunger is drawn further up the suction created thereby and the drawing back of the glass creates a cavity 48, as shown in Fig. 1 and prevents the glass from passing by gravity through said orifice. This movement, drawing the glass up-wardly through the orifice, permits the cut off end or lower portion to be reheated which eliminates the shear mark.

For preventing air pockets from forming in the glass by the reciprocating action of the plunger therein there are provided priming ducts 49, comprising grooves cut in the top surface of the block 19 and extending from each side of the plunger chamber 21 to the chamber 40, permitting the upper portion of the spout chamber 21 to be primed and filled with glass at all times, so as to prevent the plunger from being drawn in its operations above the glass level and thereby producing air pockets. As shown in the modified form in Fig. 6, said passageways 49 are provided by holes 50 bored through the block 19 so as to extend laterally therein and join each side of the plunger chamber with the chamber 40.

It will be obvious that the block 19 may be of any shape and formed in various manners, i. e., either solid or as herein shown, or by securing a plurality of blocks or pieces together. Similarly the plunger and plunger chamber may be of varying cross sectional shape.

The size of the discharged gather of glass may be varied by adjusting the reciprocal movement of the plunger through the nuts 29 on the stem 27. Also the diametrical size may be varied by changing the bushing 22 to one having a larger or smaller orifice.

It is noted from the foregoing description that the spout is divided into three chambers, the receiving chamber being separated by the partition 39, the feeding chamber lying between the partition 39 and the plunger block 19, and the heating chamber 20 lying between the block 19 and the end of the spout. Also the means for cutting off the glass supply to the plunger or discharging means is located within the spout and about midway thereof instead of in the tank as heretofore, so that the glass in the inner half or portion of the spout is of the same temperature as the glass in the tank, and is kept hot by the same means that heats the glass in the tank. Also a special heater is provided in the side of the spout to keep heated the glass in the feed chamber 40. There is an empty heating chamber in the outer end of the spout which contains no glass, because the plunger block extends across the spout and from the bottom to a point above the glass level, so that a gas jet or flame may be introduced into said heating chamber and directly against the side of the plunger block to keep it and the glass in the plunger chamber 21 hot. The flame or gas jet introduced into the end of the spout is not directed over and above the plunger block.

Since the plunger block 19 extends from the bottom of the spout to a point above the glass level, a long plunger chamber 21 is provided in which the molten glass can rise to the level of the glass in the tank and to a considerable distance above the lower end of the plunger, even when withdrawn, so as to keep the lower portion of the plunger always hot and in contact with the glass. The portion of the plunger that is thus always hot and in contact with the glass, extends a considerable distance above the lower end of the plunger, so that there is never any danger of glass accumulating and chilling on the plunger so as to choke up the passage or interfere with the operation of the machine. Even if not operated for sometime, special heating is unnecessary when the operation of the plunger is renewed, and this saves a great deal of annoyance, labor and chilling of the glass on the plunger. The measuring function of the portion of the chamber 21 below the passage 43 arises because of the contracted opening in the bushing, and the suction of the plunger in the first part of its upward movement after the gather of glass has been discharged. This enables the device to prevent the constant discharge of glass between gathers and to cause a substantially uniform measurement of the gathers of glass.

The invention claimed is:

1. Glass feeding means including a spout in which molten glass is adapted to flow, a plunger block in said spout extending from the bottom thereof to a point above the glass level therein and having a vertical plunger chamber with a discharge outlet at the lower end and an inlet passage to said chamber appreciably below the top of said block, a reciprocable plunger operating in said chamber, and means for operating said plunger which limits its upward movement so that the lower portion of the plunger is always in said plunger chamber and surrounded by glass.

2. Glass feeding means including a spout in which the molten glass is adapted to flow, a plunger block in said spout extending from the bottom thereof to a point above the glass level therein and having a vertical plunger chamber with a discharge outlet at the lower end and with the upper portion of said chamber enlarged and an inlet passage to said chamber below the enlarged portion thereof, a reciprocable plunger operating in said chamber, and means for operating said plunger which limits its outward movement so that the lower portion thereof will remain in the enlarged portion and be surrounded by glass.

3. Glass feeding means including a spout in which the molten glass is adapted to flow, a plunger block in said spout extending from the bottom thereof to a point above the glass level therein and having a vertical plunger chamber with a discharge outlet at the lower end, and an inlet passage to said chamber appreciably below the top of said block and in position to predetermine the gather of glass that will be discharged, a reciprocable plunger operating in said chamber, and means for operating said plunger which limits its upward movement so that the lower portion thereof will remain in the plunger chamber and be surrounded by glass.

4. Glass feeding means including the spout in which the molten glass is adapted to flow, a plunger block in said spout extending from the bottom thereof to a point above the glass level therein and having a vertical plunger chamber with a discharge outlet at the lower end and with the upper portion of said chamber enlarged and an inlet passage to said chamber appreciably below the top of said block, a replaceable bushing insertable in the lower end of said plunger chamber and having a contracted outlet, a reciprocable plunger operating in said chamber, and means for operating said plunger which limits its upward movement so that the lower portion of the plunger is always in said plunger chamber and surrounded by glass.

5. Glass feeding means including the spout in which the molten glass is adapted to flow, a plunger block in said spout extending from the bottom thereof to a point above the glass level therein and having a vertical plunger chamber with a discharge outlet at the lower end and with the upper portion of said chamber enlarged and an inlet passage in said chamber appreciably below the top of said block, a removable bushing insertable in the lower end of said plunger chamber and having a contracted outlet and extending up into said chamber far enough to leave a measuring chamber between the top of the bushing and the lower part of said inlet passage sufficient for predetermining the gather of glass, a reciprocating plunger in said plunger chamber, and means for operating it which causes the downward movement substantially to the top of the bushing and the upward movement thereof to a point appreciably below the glass level, whereby the lower portion of said plunger will always be surrounded by the glass.

6. The combination with a glass tank, of a glass discharge spout into which the molten glass is adapted to pass, a block in said spout provided with a chamber having a discharge orifice at the lower end thereof, a plunger so mounted as to reciprocate in said chamber for forcing molten glass through said orifice on its down stroke and drawing the same upwardly upon its up stroke for preventing further discharge of glass therethrough, said discharge orifice being provided with a bushing so tapered as to be of greater outside diameter at the bottom than the top, the orifice therethrough being of greater diameter at the top than at the bottom, and means for removably securing said bushing in position within said block and permitting its ready removal therefrom.

7. Glass feeding means including a spout into one end of which the molten glass is adapted to flow, a plunger block in said spout extending from the bottom thereof to a point above the glass level and for the full width of the spout and spaced away from the outer end of the spout so as to leave an empty chamber between said block and the outer end of the spout, said block having in it a vertical plunger chamber with a glass outlet at its lower end and a glass inlet thereto appreciably below the top of the block, a reciprocable plunger in said plunger chamber, and means in the outer end of the spout for directing the flame into the empty chamber between said block and the end of the spout and against the side of said block for keeping it and its contents heated.

8. Glass feeding means including a spout in which molten glass is adapted to flow, a plunger block in said spout extending from the bottom thereof to a point above the glass level therein and having a vertical plunger chamber with a discharge outlet at the lower end and an inlet passage to said chamber appreciably below the top of said block, a reciprocable plunger operating in said chamber, and means for operating said plunger which limits its upward movement so that the lower portion of the plunger is always in said plunger chamber and surrounded by glass, said block having an inlet passage for glass near the top thereof for always keeping the plunger surrounded by glass.

9. The combination with a glass tank and a discharge spout extending therefrom into one end of which the molten glass in the tank is adapted to pass, and a discharge outlet in the bottom of the spout near the outer end thereof, of means for controlling the discharge of glass through said outlet, a partition in said spout located appreciably away from said tank so as to leave a considerable glass receiving chamber in said spout between said partition and tank, said partition extending from the bottom of the spout to a point above the glass level and having a passage appreciably below the top thereof, and means for closing and opening said passage for shutting off the glass from said receiving chamber in the spout to the discharge end of the spout.

10. The combination with a glass tank and a discharge spout extending therefrom, of a plunger block located in the outer portion of said spout and extending from the bottom of the spout to a point above the glass level and entirely across the spout so as to leave an empty chamber between said block and the outer end of the spout, said block having a vertical plunger chamber therein with a glass outlet at the lower end and a glass inlet appreciably below the top of the block, a partition in said spout extending from the bottom of the spout to a point above the glass level and located between the glass tank and said plunger block, so as to form an appreciable glass receiving chamber between the partition and the glass tank and a feed chamber between the partition and the plunger block, said partition having a passage in it appreciably below the top thereof, means for opening and closing the passage through said partition, a plunger reciprocable in said plunger chamber, means for operating the plunger so as to maintain the lower end thereof always surrounded by glass in said plunger chamber, and means on the outer end of the spout for introducing a flame against the side of said plunger block.

11. The combination with a glass tank, of a glass discharge spout into which the molten glass is adapted to pass, said spout being provided with a receiving chamber, a feeding chamber separated therefrom by a partition having a feed opening therethrough, a float valve for opening or closing said opening, a plunger chamber positioned adjacent said feeding chamber and communicating therewith through a plurality of passageways, one above the other, a plunger adapted to be reciprocated within said plunger chamber for forcing the glass through an orifice in the bottom thereof, and means for maintaining the glass contained in said plunger chamber at a high temperature, said means comprising a space between the ends of said spout and wall of said chamber, and a nozzle for engaging a flame therein for heating the glass contained in said plunger chamber to a high temperature, substantially as described.

In witness whereof, I have hereunto affixed my signature.

JOHN RAU.